June 21, 1932.  F. W. LUTZ ET AL  1,863,573
CAMERA MECHANISM
Filed July 3, 1931  4 Sheets-Sheet 1

INVENTORS
Frederick W. Lutz
Ambrosius Briechle
BY THEIR ATTORNEYS
Hoguet & Neary

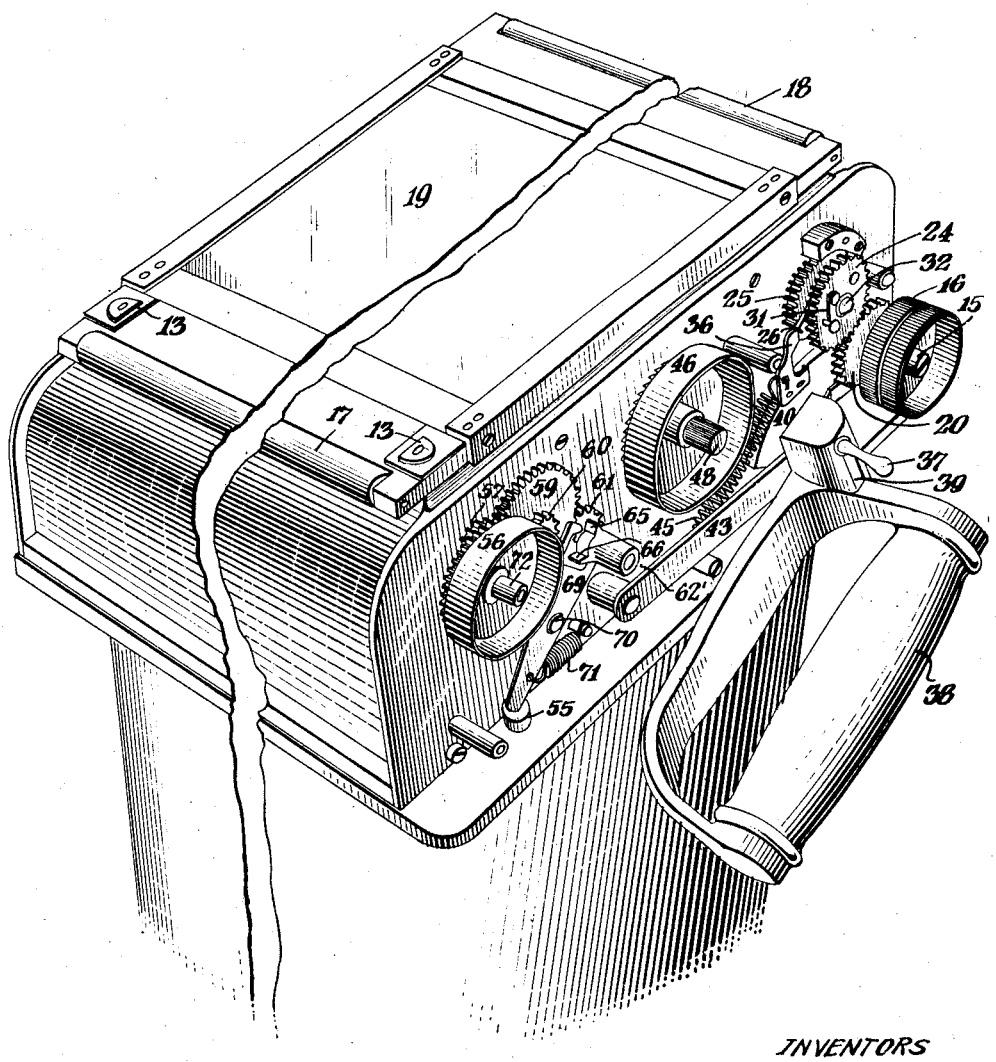

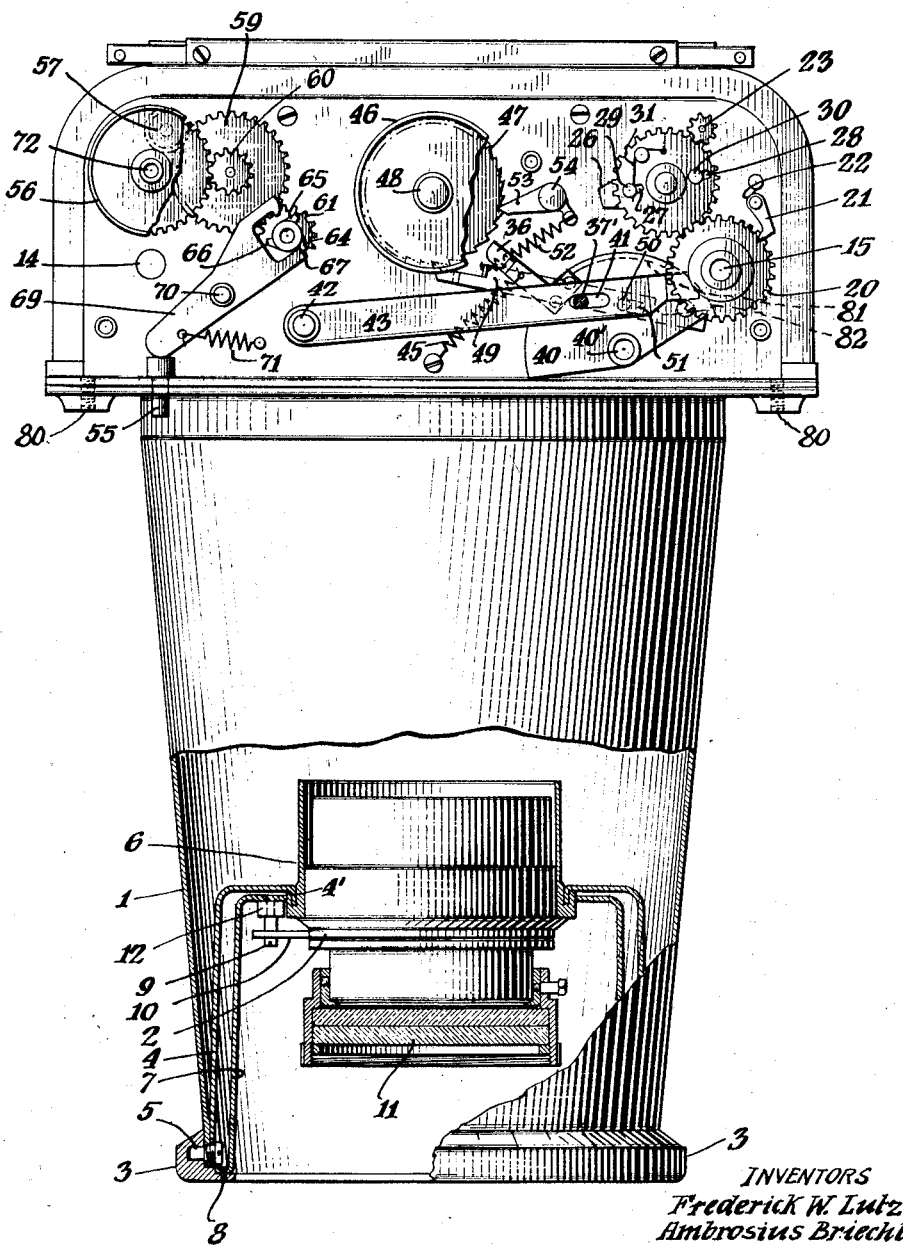

June 21, 1932.  F. W. LUTZ ET AL  1,863,573
CAMERA MECHANISM
Filed July 3, 1931   4 Sheets-Sheet 4
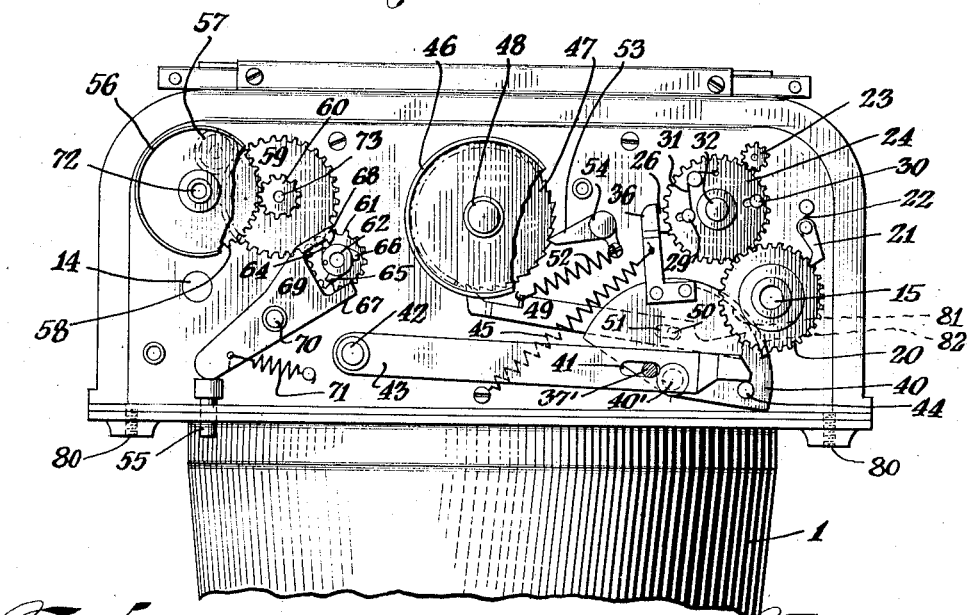
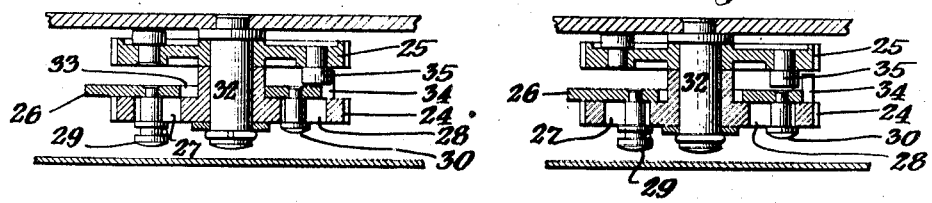
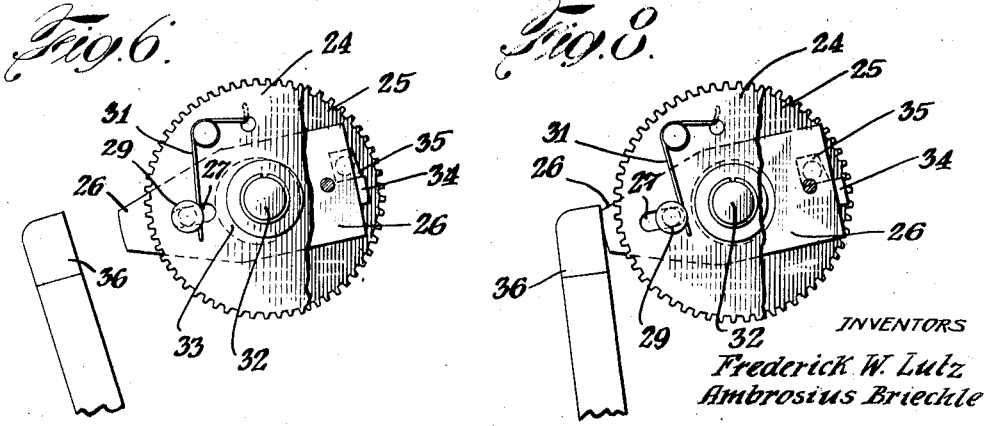
INVENTORS
Frederick W. Lutz
Ambrosius Briechle
BY THEIR ATTORNEYS
Hoguet & Neary Patented June 21, 1932

1,863,573

UNITED STATES PATENT OFFICE

FREDERICK W. LUTZ, OF FLORAL PARK, AND AMBROSIUS BRIECHLE, OF BROOKLYN, NEW YORK, ASSIGNORS TO FAIRCHILD AERIAL CAMERA CORPORATION, OF NEW YORK, N. Y., A CORPORATION OF NEW YORK

CAMERA MECHANISM

Application filed July 3, 1931. Serial No. 548,500.

This invention relates to improvements in aerial cameras and has among other objects to provide a camera which will suit all possible needs of aerial photography and more particularly to provide an inexpensive, compact, reliable, and durable aerial camera which is adapted to receive and expose photographic plates or roll or cut film, and which camera is suitable for vertical suspension to take pictures for aerial mosaic or other type of mapping work or which may be easily held and operated by hand for the taking of oblique pictures.

Another object of the invention is the provision of a camera in which the minimum amount of adjustment is necessary in order to transform the camera into a roll film, cut film or plate camera.

Another object is to provide means whereby the camera when held manually for taking oblique pictures may have its focus readily adjusted while holding the camera in normal position preparatory to taking a picture and while looking through a direct vision view finder for locating the object to be photographed.

A further object is to provide a simple but reliable operating mechanism for the operation of the shutter and for the advancement of the roll film or the proper shifting of the cut film or plates depending upon the type of photo-sensitive material employed.

A still further object is to provide a combined retard and adjustment mechanism for regulating and adjusting the speed of travel of the shutter curtain, this adjustment to be accomplished in a most convenient manner while the camera is completely assembled for operation.

To this end it is proposed to so construct and arrange in the camera body the film spools and the film advancing mechanism and the transparent exposure plate, that an easily detachable cover may be placed thereover when using roll film. It is further proposed to provide attachments for the transparent exposure plate so that it may be readily detachable and either a plate or cut film magazine may be inserted in place of the glass plate and retained there by means of the same attachment devices for holding the glass plate in place. When such plate or cut film magazines are employed a different cover is used but in either instance the cover comprises no operative parts so that there is no confusion in the interchangeability of the camera to receive photo-sensitive material of the three types mentioned. The film advancing mechanism for the roll film merely remains inactive and requires no adjustment or disconnection when the roll film is discarded and the plate or cut film magazine is inserted in the space formerly occupied by the glass exposure plate, and in any instance the tripping of the shutter is identical.

In order to render the camera especially adaptable for taking oblique pictures, it is proposed to fit the camera with a direct vision view finder for locating the object to be photographed and to provide suitable gripping handles and a rotatable calibrated ring on the lower extremity of the cone to indicate the focus adjustment, this ring being conveniently operable while holding and pointing the camera at the object to be photographed.

With the foregoing and other objects in view, the invention resides in the combination of parts and in the details of construction hereinafter set forth in the following specification and appended claims, certain embodiments thereof being illustrated in the accompanying drawings, in which:

Figure 2 is a view in perspective partly broken away of the camera with the top cover and side cover plate removed to show the glass exposure plate in position for exposing roll film, and showing the mechanism for controlling the advancement of the film and tripping the shutter.

Figure 3 is a view in elevation of the same as shown in Figure 2, with an additional showing of the cone partly broken away to show the lens in the lower part thereof, and showing the operating mechanism in position prior to the tripping of the shutter.

Figure 4 is a view similar to Figure 3 showing the operating mechanism in position after the tripping of the shutter.

Figure 5 is a detail view in section of the gears for winding the film and shutter with an intervening clutch locking them together.

Figure 6 is a detail view in elevation and partly in section of the gear and clutch, as shown in Figure 5, with the operating arm removed.

Figure 7 is a view annular to Figure 5 showing the clutch in unlocked position.

Figure 8 is a similar view to Figure 6 with the clutch unlocked, as in Figure 7, with the operating arm in contact with the clutch.

Figure 1:
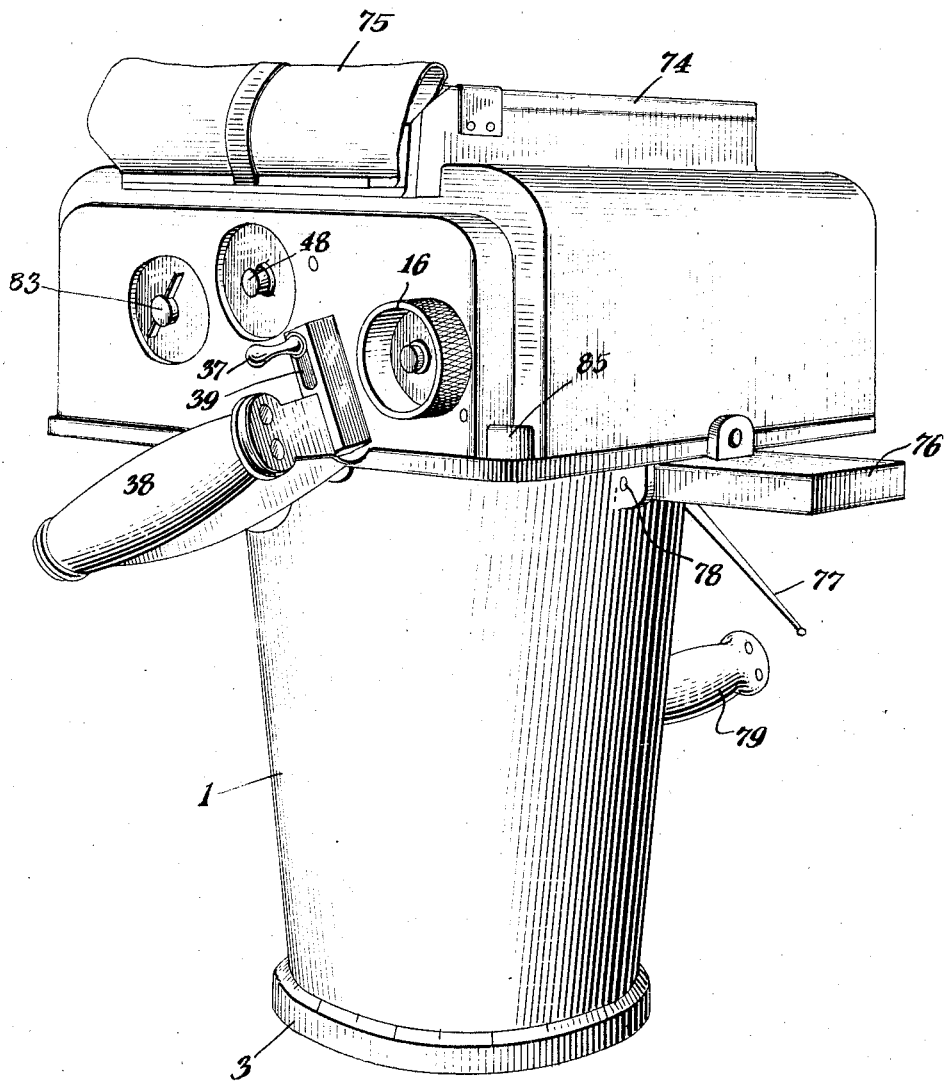
Figure 1 is a view in elevation of the camera with a cut film magazine attached.

Referring more particularly to the drawings, the camera bears a general resemblance to the well-known and accepted Fairchild aerial camera of the type employing a focal plane shutter, which latter consists of a cloth curtain travelling in the focal plane and provided with a narrow slit to admit light to the photo-sensitive material.

The camera is provided with a cone 1, containing a lens with its carrier 2, and a calibrated rotatable ring 3 mounted thereon for convenient adjustment of the lens for changing the focus of the camera and the important feature in this regard is employment of the ring 3 and its convenient location rather than the operative connection between the ring and the lens, which is shown more or less diagrammatically in Figure 3. The support for the lens carrier 2 and filter 11 may comprise a cylinder 6 connected to the cone 1 by means of a support 4 fastened by a set screw 5 to the cone, the other end of the support 4 being flanged at 4' to fit within a corresponding groove in the cylinder 6. A support 7 connected at 8 to the ring extends upwardly and carries a support 12 for the arm 9, which engages an arm 10, which adjusts the lens upon the turning of the ring.

When it is desired to operate the camera as a roll film camera the glass plate 19 is placed over the exposure opening, as shown in Figures 2 and 3 immediately above the focal plane shutter (not shown) and fastened by means of tongue and groove expedients and suitable latch devices such as shown at 13. The actual film spools are concealed from view, but the spool from which the film is drawn, hereinafter referred to as the feed spool is mounted on the shaft 14 while the spool upon which the film is wound, hereinafter referred to as the storage spool, is mounted on the shaft 15. During the operation of the camera the winding of the knob 16 causes the film to be drawn from the feed spool over the roller 17, over the glass plate 19 and a corresponding roller 18 on the other side, and then on to the take-up spool carried by the shaft 15. This advancement of film is brought about by a manual wind of the knob 16 in a clockwise direction causing the shaft 15 and the take-up spool to be rotated accordingly. A gear 20 is mounted on the shaft 15 to rotate therewith and a counter-clockwise rotation of the knob 16, shaft 15 and gear 20 is prevented by a pawl 21 urged into contact with the gear teeth by a spring 22.

Simultaneously, with the advancement of the film, the turning of the knob also effects a winding of the shutter which may be of the conventional slit curtain focal plane type common in Fairchild aerial camera design. The shutter like the film is wound forwardly, left to right, and is drawn forwardly by a reel controlled by a gear 23 off of a reel controlled by a gear 57 against the action of a suitable return spring associated with the latter reel. Rotary winding motion is imparted to the gear 23 by means of an outer gear 24 meshing with gear 20 and an inner gear 25 meshing with gear 23, there being provided a clutch between gears 24 and 25 to provide for a uniform rotation in a counterclockwise direction and an independent reverse rotation of gear 25 after a tripping of the shutter to permit the same to return to unwound position.

This clutch comprises a plate 26 arranged on the inner face of the outer gear 24 and secured thereto by means of studs on the plate extending through elongated slots 27 and 28 in the gear, the studs having enlarged heads 29 and 30 respectively, thus allowing sliding movement of the clutch plate which is normally forced to the left by a spring 31. When the clutch plate is in this position, as shown in Figures 5 and 6, the gears 24 and 25 are locked to each other so as to be rotatable in unison in a counterclockwise direction. Gear 24 is mounted on a shaft 32 to rotate therewith while the clutch plate is provided with an enlarged slot 33 by which the plate loosely encircles the shaft, and gear 25 is also loosely mounted on the shaft.

Referring to Figures 5 and 6, a lug 34 carried on the inner face of the clutch plate is shown abutting a lug 35 carried on the outer face of the inner gear 25, the abutment of these two lugs locks the gear 25 against the action of the shutter return spring tending to rotate the gear clockwise. Likewise this abutment of the two lugs renders it possible to rotate the two gears 24 and 25 counter-clockwise by turning the hand knob clockwise and thus wind the shutter and film together.

A manual shutter tripping member 37 arranged on the hand grip 38 is convenient for operation while holding the camera and a downward pressure causes the member 37 to slide bodily in the slot 39, causing its extension 37' extending through the elongated slot 41 to exert pressure on the lever 43. Lever 43 is pivoted at one end at 42 and bears downwardly against a stud 44 carried on the outer face of a disc 40 which is pivoted at 40'. As the shutter trip extension 37' is pushed down and slides in the slot 41 the lever 43 in abutting the stud 44 causes the disc 40 to rotate clockwise until a flange 36 carried by the disc abuts the clutch plate 26, as shown in Figures 4 and 8. This forces the plate to slide to the right on its studs 29 and 30 until the lug 34 carried by the plate is pushed beyond the lug 35 carried by gear 25, as shown in Figures 7 and 8 and when this obtains, gear 25 is free to be rotated independently of gear 24 under the influence of the shutter return spring.

Upon a release of pressure on the manual shutter tripping member the disc 40 is returned to the left by the action of the tension spring 45 connected to the arm 36 and to the casing.

In order to insure against double exposure or the winding of film prior to the completion of the shutter tripping operation, there is provided an outwardly turned arcuate flange 81 on the disc 40 to register with a correspondingly formed groove in the inner face of the gear 20. The flange 81 is of such dimensions that it is impossible to rotate the disc 40 to cause a tripping of the shutter prior to the complete revolution of the gear 20 when the groove 82 is in line with flange 81, as shown in Figure 3. The shutter trip may then be operated as shown in Figure 4 which shows the flange fitting in the groove. In this position it is impossible to rotate the gear 20 to wind the film or shutter until the flange has been removed from the groove which occurs upon a release of the shutter trip, whereupon the spring 45 rotates the disc counterclockwise.

There is also provided a counter for indicating the number of film exposures and this comprises a ratchet 47 mounted on a pin and adapted to be rotated in a clockwise direction. The ratchet wheel carries a consecutively numbered cylinder 46 and upon each complete rotation of the gear 20 a stud (not shown) carried on the inner face thereof abuts against one end of an arm 49, which is carried on a stud 50 fitting loosely in an elongated slot 51 of the arm, causing the latter to be moved to the left. As this movement occurs, the other end of the arm engages the ratchet 47 causing it to be advanced clockwise and bring another index number of the cylinder 46 into view.

This action of the arm 49 is against the tension of a spring 52 extending between the arm and a pawl 53 pivoted at 54 for preventing a counterclockwise rotation of the ratchet and consequently after the stud on gear 20 passes over the other end of the arm 49 the latter will be returned to the right by spring 52 in readiness for a return of such stud upon the completion of another revolution of the gear 20.

It has been found desirable not only to provide means for obtaining a uniform speed of travel of the shutter curtain during the exposure but also to provide a means for predetermining and adjusting the speed as the occasion demands. Accordingly there is provided a convenient means whereby these desired results may be accomplished and it is only necessary to turn a winding knob 83 to increase the tension or to push a simple plunger 55 to decrease the tension on the shutter return spring until the desired speed is indicated on an indicating cylinder 56. The reading of cylinder 56 is an indication of the tension of the spring and the speed of travel of the shutter return that the spring will cause after the shutter has been tripped. The mechanism to bring this about comprises a gear wheel 58 which carries the cylinder 56 mounted on a pin 72. Mounted on a pin 73 is a gear wheel 59 which also carries a smaller gear 60. These gears are so arranged that gear 57 meshes with gear 59 and gear 58 meshes with gear 60, while gear 59 also meshes with gear 61 which carries a pallet wheel 62 having two long prongs 64 and 65 and a shorter one 66. A pallet 69 pivoted at 70 is urged in a counterclockwise direction by means of a tension spring 71 connected to one end thereof and to the casing. This pallet lever is provided with a recessed portion described by a hook at the top extremity and a flat prong at the other.

The immediately above described mechanism is for the purpose of maintaining the desired tension on the shutter return spring in order to accomplish the desired speed of travel of the shutter during its return after the camera has been tripped, and does not operate other than to maintain this desired spring tension.

The turning handle 83 is mounted on the elongated shaft 62' of the escapement wheel 62. When it is desired to effect an increased tension on the shutter return spring and a consequent increase in shutter speed, the handle 83 is rotated counterclockwise, gear 61 causing an opposite rotation of gear 59 and gear 60 carried thereby, gear 60 in meshing with gear 58 causes the latter to rotate counterclockwise and a gear (not shown) carried by gear 58 meshes with and causes gear 57 to rotate clockwise to wind the shutter return spring, the tension or speed indication being altered by the rotation of the indicator cylinder 56. Upon the release of the handle 83, the projection 67 abuts against tooth 64 of the escapement wheel and prevents a clockwise rotation thereof and a consequent spending of the energy of the shutter spring.

When it is desired to effect a lesser tension of the shutter spring the plunger 55 may be pushed upwardly to rotate the arm 69 against the action of the spring 71. This causes a disengagement of the projection 67 from the tooth 64 (Figure 3) and allows a rotation of the wheel until the hook 68 engages the tooth 64 preventing further rotation (Figure 4). This operation may be repeated until the indicator cylinder 56 gives the desired reading. It will be understood that each operation of the plunger allows only a limited rotation of the wheel as the members 67 and 68 alternately engage the teeth of the wheel to prevent such rotation until removed by the operation of the plunger.

As previously stated, the cylinder 56 indicates the speed of shutter travel and is so calibrated with respect to the tension of the shutter return spring that a subsequent winding of the shutter and a tripping of the shutter will cause the shutter to be returned at the speed indicated on the indicating cylinder.

It will be remembered that there is no rotation of the above mentioned train of gears during the film winding and shutter winding operation as this is prevented in the manner described above, and this is for the purpose of allowing a tension to be set up in the shutter spring as the knob 16 is turned.

When it is desired to operate the camera as a plate or cut film camera, it is not necessary to disturb the film winding release, providing they have no film upon them.

Figure 1 shows a cut film magazine 74 with an ejector receptacle 75 connected thereto to receive the exposed cut film. After the latch devices 13 have been turned the glass plate 19 is merely withdrawn from its position shown in Figure 2 and the magazine 74 is so arranged that it will fit in the space formerly occupied by the glass 19 and the latch devices in connection with the tongue and groove arrangements in the casing and the magazine 74 is inserted there instead and held by such devices.

A direct vision view finder 76 with a pointer 77 is hingedly connected at 78 to the cone and for oblique photography the operator grasps the hand grip 38 with his right hand and the hand grip 79 with his left holding the camera against his body and looking through the view finder 76. While holding the camera in this position it is convenient to temporarily release the hold on the hand grip 38 and rotate with the right hand the calibrated ring 3 for adjusting the focus as hereinabove described.

When it is desired to utilize the camera for vertical mapping work, either roll film, cut film or plates may be used and the view finder 76 being pivotally connected to the cone, it may be folded out of the way, so that the camera will be ready for attachment in a gimbal frame, the two bosses 80 indicating a means for such attachment, while 85 is a spirit level.

Thus there is provided a camera in which either roll film, cut film or plates may be used and in any event it is not necessary to disturb the mechanism for advancing the roll film when other types of photosensitive material are employed, it being only necessary to remove the glass exposure plate and insert there instead plate or cut film magazines. In this connection, it is merely necessary to substitute one magazine cover for another. Moreover there is provided a camera which is thoroughly accessible for use as a vertical mapping camera and also a camera for oblique photography, in which latter case the focus of the camera may be readily adjusted while being held in operative and pointed position.

Having thus described our invention, we claim:

1. In an aerial camera, a roll film magazine, said camera being provided with an exposure opening and a transparent plate adapted to be releasably held thereover by attachment devices, said camera also being adapted to receive magazines containing plates or cut film without the removal of said roll film magazine or reels or film advancing mechanism associated therewith, and by the mere removal of said transparent plate and insertion in lieu thereof, said magazine containing plates or cut film and retention in place by said attachment devices, and a shutter and operating means therefor operable in the same manner in each instance of use of said photosensitive materials.

2. In an aerial camera, a roll film magazine, said camera being provided with an exposure opening and a transparent plate adapted to be releasably held thereover by attachment devices, said camera also being adapted to receive magazines containing plates or cut film without the removal of said roll film magazine or reels or film advancing mechanism associated therewith, and by the mere removal of said transparent plate and insertion in lieu thereof, said magazine containing plates or cut film and retention in place by said attachment devices, and a shutter and operating means therefor operable in the same manner in each instance of use of said photosensitive materials, said camera being provided with suitable attachments for vertical suspension and also with hand grips for bodily holding and operation.

3. In an aerial camera, a roll film magazine, said camera being provided with an exposure opening and a transparent plate adapted to be releasably held thereover by attachment devices, said camera also being adapted to receive magazines containing plates or cut film without the removal of said roll film magazine or reels or film advancing mechanism associated therewith, and by the mere removal of said transparent plate and insertion in lieu thereof, said magazine containing plates or cut film and retention in place by said attachment devices, and a shutter and operating means therefor operable in the same manner in each instance of use of said photosensitive materials, said camera being provided with suitable attachments for vertical suspension and also with hand grips for bodily holding and operation, a direct vision view finder mounted on the body of said camera, and rotatable calibrated ring mounted on the cone of said camera operable by hand to adjust the focus of the camera while in position for taking a photograph of the desired view.

4. In an aerial camera employing roll film, film advancing and shutter tripping mechanism, a single manually operated turning member for advancing said film and setting said shutter, a manually operated device for predetermining and adjusting the speed of operation of said shutter after it has been tripped, a rotatable ring mounted on the lower end of the cone of said camera and operable, while said camera is manually and bodily held in picture taking position, to adjust the lens and thereby the focus of said camera.

5. In an aerial camera, film advancing and shutter control mechanism, a lens carrying cone and a direct vision view finder attached thereto, hand grips attached to said camera whereby it may be bodily held and manually positioned for photography, a rotatable calibrated ring mounted on the lower end of said cone for adjusting said lens and consequently the focus of said camera while the latter is in such position.

6. In an aerial camera of the focal plane type, film advancing and shutter setting mechanism controllable by a single manually operated turning member, a shutter tripping device, said mechanism comprising a pair of parallel gears controlling the operation of its respective mechanism, a clutch between said gears whereby both may be rotated in unison to a predetermined extent after which said shutter tripping device may be operated, said clutch being adapted to be disengaged by the operation of said last named device to permit an opposite and independent rotation of said shutter controlling gear and a consequent return of said shutter preliminary to a repetition of simultaneous film advancement and shutter setting.

7. In an aerial camera of the focal plane type, film advancing and shutter setting mechanism controllable by a single manually operated turning member, a shutter tripping device, said mechanism comprising a pair of parallel gears controlling the operation of its respective mechanism, a clutch between said gears whereby both may be rotated in unison to a predetermined extent after which said shutter tripping device may be operated, said clutch being adapted to be disengaged by the operation of said last named device to permit an opposite and independent rotation of said shutter controlling gear and a consequent return of said shutter preliminary to a repetition of simultaneous film advancement and shutter setting, and a manually operable device for adjusting and controlling the speed of movement of the shutter during the exposure operation.

8. In an aerial camera of the focal plane type, film advancing and shutter setting mechanism controllable by a single manually operated turning member, a shutter tripping device, said mechanism comprising a pair of parallel gears controlling the operation of its respective mechanism, a clutch between said gears whereby both may be rotated in unison to a predetermined extent after which said shutter tripping device may be operated, said clutch being adapted to be disengaged by the operation of said last named device to permit an opposite and independent rotation of said shutter controlling gear and a consequent return of said shutter preliminary to a repetition of simultaneous film advancement and shutter setting, and mechanism controlled by a manually operable device for adjusting and controlling the speed of movement of the shutter during the exposure operation, said mechanism comprising spring means under tension for resiliently restraining said shutter in retarded position, a cooperative pallet and pallet wheel for restraining expenditure of force of said tension spring providing for a uniform speed of operation of said shutter, and manually controlled means connected with said pallet whereby the tension of said spring and speed of operation of said shutter may be predetermined and adjusted.

9. In an aerial camera of the focal plane type, film advancing and shutter setting mechanism controllable by a single manually operated member, a manual shutter tripping device, and mechanism controlled by a manually operable device for adjusting and controlling the speed of movement of the shutter during the exposure operation, said mechanism comprising spring means under tension for resiliently restraining said shutter in retarded position, a cooperative pallet and pallet wheel for restraining the expenditure of force of said tension spring providing for a uniform speed of operation of said shutter, and manually controlled means connected with said pallet whereby the tension of said spring and speed of operation of said shutter may be predetermined and adjusted.

10. In an aerial camera of the focal plane type employing a slit curtain shutter held under spring tension in retarded position, film advancing and shutter setting and tripping devices, means for effecting a uniform speed of travel of said shutter during the exposure operation, and a manually operable control member associated therewith for predetermining and adjusting said means.

11. In an aerial camera of the focal plane type employing a slit curtain shutter held under spring tension in retarded position, film advancing and shutter setting and tripping devices, a pallet and pallet wheel driven by said spring for effecting a uniform speed of travel of said shutter during the exposure operation, and a manually operable plunger associated therewith whereby said pallet wheel may be placed in a position to be moved by said spring to alter the tension thereof. for predetermining and adjusting the speed of travel of said shutter during the exposure operation.

In testimony whereof, we have signed our names to this specification, this 30th day of June, 1931.

FREDERICK W. LUTZ.
AMBROSIUS BRIECHLE.